(No Model.)

E. BYRNES.
SPLINTER BAR FOR VEHICLES.

No. 576,361. Patented Feb. 2, 1897.

Witnesses.
Edw. D. Duvall Jr.
Charles E. Riordon

Inventor.
Edward Byrnes
By Butterworth & Dowell
his Attys.

UNITED STATES PATENT OFFICE.

EDWARD BYRNES, OF NEW YORK, N. Y.

SPLINTER-BAR FOR VEHICLES.

SPECIFICATION forming part of Letters Patent No. 576,361, dated February 2, 1897.

Application filed September 16, 1896. Serial No. 605,959. (No model.)

*To all whom it may concern:*

Be it known that I, EDWARD BYRNES, a citizen of the United States, residing at New York, in the county of New York and State of New York, have invented certain new and useful Improvements in Splinter-Bars; and I do hereby declare the following to be a full, clear, and exact description of the invention, such as will enable others skilled in the art to which it appertains to make and use the same.

This invention relates to the running-gear of vehicles, but more particularly to splinter-bars for use with platform-carriages, broughams, coupés, cabs, and similar vehicles.

The primary object of my invention is to provide a splinter-bar with means for attaching the same to the forwardly-projecting arms of the running-gear of a vehicle in such manner that the splinter-bar is adapted to be used with a variety of vehicles having forwardly-projecting arms or other securing portions of the running-gear to which the splinter-bar is attached located at different distances apart in different vehicles, so as to adapt the splinter-bar to be quickly and easily applied to a vehicle and to be readily removed therefrom and applied to another vehicle, regardless of the varying distances between the projecting arms of the running-gears of different vehicles.

Another object is to provide a simple, inexpensive, and efficient splinter-bar with means for removably securing the same to the running-gear of a vehicle, so as to adapt the splinter-bar to be readily detached at will to permit the substitution of thills or shafts for a draft-pole.

The invention will first be hereinafter more particularly described with reference to the accompanying drawings, which form a part of this specification, and then pointed out in the claims at the end of the description.

Figure 1:
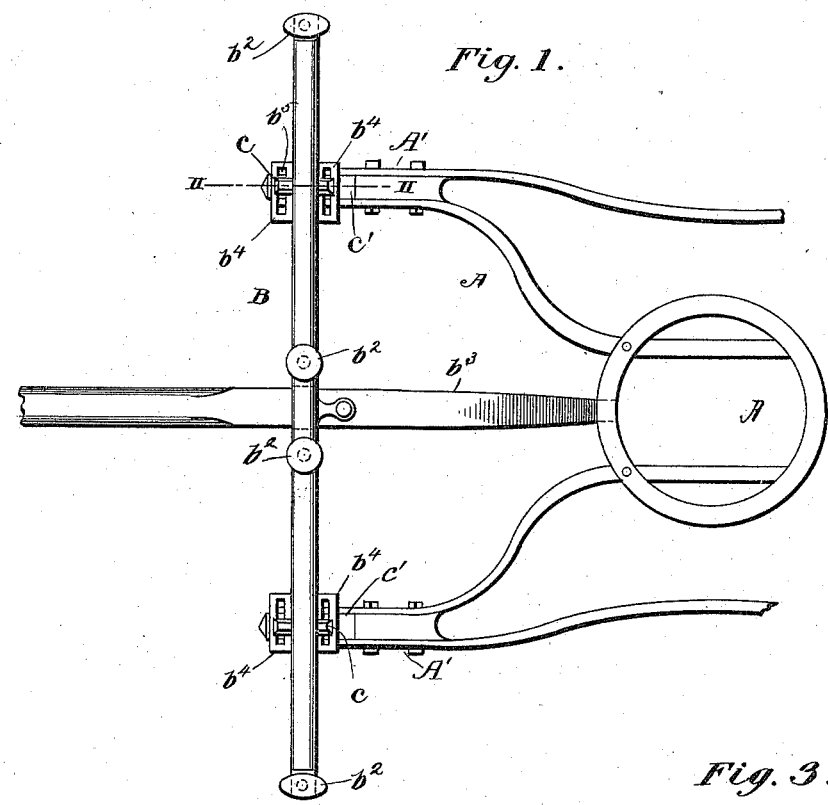
Figures 2, 3:
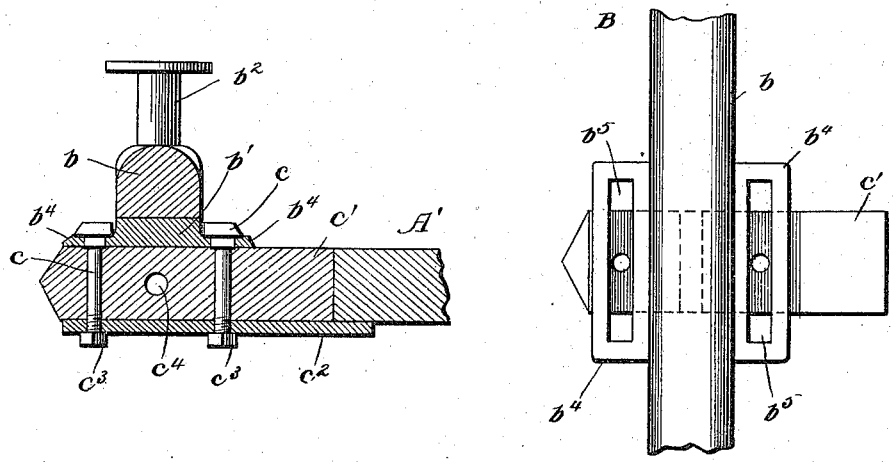

In the drawings, Figure 1 represents a plan of a fragmentary portion of one form of running-gear embodying my invention. Fig. 2 is a vertical transverse section, on an enlarged scale, through the adjustable connection between the splinter-bar and one of the forwardly-projecting arms of the running-gear, the section being taken on the line II II of Fig. 1; and Fig. 3 is a plan view of a portion of the splinter-bar detached from the running-gear, illustrating the adjustable connection, by which it may be secured to the projecting arm of the running-gear.

A may denote the running-gear of a vehicle of any preferred form, to the forwardly-projecting arms A' A' of which is secured the splinter-bar B. This splinter-bar preferably consists of a wooden bar $b$ and a metallic bottom plate $b'$, rigidly secured to said wooden bar and extending the length of the latter. The bar $b$ may have pins or studs $b^2$ or other means thereon for the attachment of the traces and a socket (not shown) through which the pole $b^3$ may pass, all of which parts may be of the usual or of any preferred construction and arranged in any desired manner.

For the purpose of adjusting the parts so as to adapt the splinter-bar or draw-bar to be fitted to or employed on different carriages or other vehicles in which the distance between the projecting arms A' or other securing portions of the running-gears may vary I preferably provide the bottom plate $b$ with apertured ears or projections $b^4$, extending outwardly from said plate and located on opposite sides of its pole-socket or longitudinal center. These ears or projections are preferably formed integrally with the bottom plate and may be arranged in pairs or sets, so as to provide two projections or ears on the forward side of said plate, and two ears or projections on the rear side, in order that the bar may be rigidly held to the projecting arms or securing portions of the running-gear, though it is obvious that in some instances either of the projections on the forward or the rear side of the bar may be dispensed with.

The ears or projections are each preferably provided with slots $b^5$, which extend parallel with or longitudinally of the bar and have bolts $c$ passing through said slots, so as to be adjustable transversely of the vehicle.

The bolts $c$ may have a square body portion for a part of their length immediately below their heads adapted to fit and slide in the slots in the ears or projections $b^4$, so that the bolts may be rigidly held against rotary motion and readily guided in said slots, said bolts having their heads resting upon the upper surface of the projections, and their body portions passed directly through apertures in the projecting arms A' or other securing portions of the running-gear of the vehicle when forming a permanent fixture, or, as shown, said bolts may be passed through blocks $c'$ and clamping-plates $c^2$, arranged under said blocks, so that when the nuts $c^3$ of the bolts $c$ are tightened the blocks will be rigidly held to the bottom plate $b'$. These blocks may be of wood and are adapted to fit between the stays or divided parts of the projecting arms A' of the running-gear or in a socket formed therein or otherwise, and may have transversely-arranged apertures $c^4$ registering with apertures in the stays or other securing portions of the running-gear, through which apertures bolts may be passed in the usual manner in order to removably secure the splinter-bar between the stays, so as to permit the ready removal of the bolts when it is desired to remove the splinter-bar and attach shafts or thills to the running-gear.

The construction and manner of using the invention will be readily understood from the foregoing description when taken in connection with the accompanying drawings. As will be seen, if the nuts $c^3$ of the bolts $c$ are loosened the said bolts and the blocks $c'$ and clamping-plates $c^2$, when the latter are used, may be adjusted lengthwise of the splinter-bar, so as to vary the distance between said bolts to conform to the distance between the forwardly-projecting arms or securing portions of the running-gear. I thus provide simple, inexpensive, and efficient means whereby a splinter-bar may be readily secured to a variety of vehicles having projecting arms or other securing portions of the running-gear arranged at different distances apart.

It is obvious that the splinter-bar or drawbar may be otherwise slotted than in the manner shown and that instead of the slots a series of apertures may be provided, so as to secure various adjustments of the bolts. Other changes may be made and some of the parts may be dispensed with or others substituted therefor without departing from the spirit of my invention.

I desire it to be understood that the term "apertured" as employed in the claims may refer to a series of apertures or to an elongated slot for securing the desired adjustments, as stated in the preceding paragraph.

Having thus fully described my invention, what I claim as new, and desire to secure by Letters Patent of the United States, is—

1. A splinter-bar provided with apertured ears or projections arranged on opposite sides of its longitudinal center and extending outwardly therefrom; said ears or projections having means for adjustably securing the splinter-bar on opposite sides of the draft-pole to the forwardly-projecting arms or securing portions of the running-gear of a vehicle; whereby the splinter-bar is adapted to be readily applied and removably secured to different vehicles, some of which may have their projecting arms or other portions for connecting with the splinter-bar arranged farther apart or nearer together than the corresponding parts of the other vehicles, substantially as described.

2. A splinter-bar provided on opposite sides of its longitudinal center with apertured ears or projections extending outwardly therefrom and adapted to receive the fastening-bolts by which it may be removably secured to the running-gear of a vehicle, whereby an adjustable connection is provided for attaching the bar on opposite sides of the draft-pole to different vehicles, some of which may have their projecting arms or other portions for connecting with the splinter-bar arranged farther apart or nearer together than the corresponding parts of the other vehicles, substantially as described.

3. A splinter-bar comprising a suitable wooden bar having a metallic bottom plate rigidly secured thereto; the latter having ears or projections formed integrally therewith and extending outwardly therefrom on the forward and rear sides thereof on opposite sides of its longitudinal center; said ears or projections being provided with elongated slots, and bolts fitting the said slots to adapt the bar to be removably secured to carriages or other vehicles; whereby the splinter-bar is adapted to be readily applied and removably secured to different vehicles, some of which may have their projecting arms or other portions for connecting with the splinter-bar arranged farther apart or nearer together than the corresponding parts of the other vehicles, substantially as described.

4. The combination with a vehicle running-gear, of a splinter-bar comprising a wooden bar, a metallic bottom plate rigidly secured thereto, means for securing the traces, and ears or projections formed integrally with said bottom plate on the forward and rear sides thereof on opposite sides of its longitudinal center, suitable clamping-plates, blocks interposed between the bottom plate and the clamping-plates immediately below the ears or projections, bolts having their body portions passed through the slots of the ears or projections so as to adjustably hold the blocks and clamping-plates to the splinter-bar, and means for removably securing the blocks to the running-gear, substantially as described.

In testimony whereof I affix my signature in presence of two witnesses.

EDWARD BYRNES.

Witnesses:
MARTIN HIGGINS,
JOE CROME.